United States Patent
Mizuno

(10) Patent No.: US 9,862,286 B2
(45) Date of Patent: Jan. 9, 2018

(54) POWER SUPPLY SYSTEM, AND VEHICLE AND MANAGEMENT DEVICE USED THEREIN

(71) Applicant: Tomoyuki Mizuno, Toyota (JP)

(72) Inventor: Tomoyuki Mizuno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 340 days.

(21) Appl. No.: 14/431,149

(22) PCT Filed: Sep. 23, 2013

(86) PCT No.: PCT/IB2013/002084
§ 371 (c)(1),
(2) Date: Mar. 25, 2015

(87) PCT Pub. No.: WO2014/049413
PCT Pub. Date: Apr. 3, 2014

(65) Prior Publication Data
US 2015/0239362 A1    Aug. 27, 2015

(30) Foreign Application Priority Data

Sep. 26, 2012    (JP) .................................. 2012-212708

(51) Int. Cl.
*B60L 11/18*    (2006.01)
*B60L 11/12*    (2006.01)
(Continued)

(52) U.S. Cl.
CPC ........... *B60L 11/1842* (2013.01); *B60L 11/12* (2013.01); *H02J 3/32* (2013.01); *H02J 2003/007* (2013.01);
(Continued)

(58) Field of Classification Search
USPC ........ 320/104, 109; 700/286, 295; 307/10.1, 307/29
See application file for complete search history.

(56) References Cited

U.S. PATENT DOCUMENTS 7,612,466 B2 * 11/2009 Skutt .................... B60L 11/1842
                                                       307/29
8,019,483 B2 *  9/2011 Keefe .................. B60L 11/1842
                                                       700/286
(Continued)

FOREIGN PATENT DOCUMENTS

EP    2614981 A2    7/2013
JP    2007-236023 A   9/2007
(Continued)

*Primary Examiner* — An Luu
(74) *Attorney, Agent, or Firm* — Oliff PLC

(57) ABSTRACT

A power supply system supplies power from a plurality of vehicles to an external electrical apparatus. When power is supplied, the plurality of vehicles can select one of a generated-power supply mode, in which an engine is driven and a charged-power supply mode in which the engine is not driven. The power supply system includes a control unit that controls power to be supplied from the plurality of vehicles and, when power is supplied to the electrical apparatus, performs control so that the charged-power supply mode is selected for at least one of the plurality of vehicles that are power supply sources.

11 Claims, 12 Drawing Sheets

(51) Int. Cl.
*H02J 3/32* (2006.01)
*H02J 3/00* (2006.01)

(52) U.S. Cl.
CPC ............. *Y02E 60/721* (2013.01); *Y02E 60/76* (2013.01); *Y02T 10/7005* (2013.01); *Y02T 10/7072* (2013.01); *Y02T 10/7077* (2013.01); *Y02T 90/121* (2013.01); *Y02T 90/128* (2013.01); *Y02T 90/14* (2013.01); *Y02T 90/163* (2013.01); *Y04S 10/126* (2013.01); *Y04S 40/22* (2013.01)

(56) References Cited

U.S. PATENT DOCUMENTS

| | | |
|---|---|---|
| 2005/0279242 A1 | 12/2005 | Maier et al. |
| 2006/0250902 A1 | 11/2006 | Bender et al. |
| 2008/0077286 A1 | 3/2008 | Oyobe et al. |
| 2009/0315512 A1 | 12/2009 | Ichikawa et al. |
| 2016/0164289 A1* | 6/2016 | Oyobe ................ B60L 1/00 307/80 |

FOREIGN PATENT DOCUMENTS

| | | |
|---|---|---|
| JP | 2008-043040 A | 2/2008 |
| JP | 4424352 B2 | 3/2010 |
| JP | 2013184642 A | 9/2013 |
| WO | 2006059763 A1 | 6/2006 |

\* cited by examiner

POWER SUPPLY SYSTEM, AND VEHICLE AND MANAGEMENT DEVICE USED THEREIN

BACKGROUND OF THE INVENTION

1. Field of the Invention

The present invention relates to a power supply system and a vehicle and a management device used in the power supply system, and more particularly to the control of a hybrid vehicle capable of supplying power to an external electrical apparatus.

2. Description of Related Art

Recently, a technology is developed for supplying power, stored in or generated by a vehicle, to an external electrical apparatus or a household with an electric vehicle or a hybrid vehicle as the power supply source.

International Publication No. WO2006/059763 discloses a power supply system in which a plurality of vehicles, capable of generating power using the output of an internal combustion engine, is connected in parallel with an electric load as the power supply source. In the power supply system described in International Publication No. WO2006/059763, the power supply amount of the vehicles is allocated based on the load amount of the electric load and the amount of power that can be supplied from each vehicle calculated from the residual fuel.

When a hybrid vehicle, which has both an accumulator device and an internal combustion engine, is used as a power supply source, one of the following two modes may be selected in some cases. In one mode, the power stored in the accumulator device is supplied with the internal combustion engine stopped (hereinafter also called "charged-power supply mode"); in the other mode, the power generated using the output of the internal combustion engine is supplied (hereinafter also "generated power supply mode").

In such a vehicle, one of the power supply modes described above is selected in some cases according to the state of charge (hereinafter also called SOC) of the accumulator device. For example, when the SOC is higher than a predetermined value, the charged-power supply mode is selected. When the SOC becomes lower than the predetermined value, the generated-power supply mode is selected in which case the power supply is controlled such that the accumulator device is charged while supplying power to an external electric load.

When a plurality of hybrid vehicles is connected to an electric load in this way, it is necessary to appropriately determine the allocation of the amount of power supplied from the vehicles and the power supply mode of the vehicles. In particular, failure to appropriately select the power supply modes of the vehicles results in many vehicles selecting the generated-power supply mode, sometimes generating noises and vibrations, associated with the operation of the internal combustion engines, and increasing the emission of exhaust gas.

SUMMARY OF THE INVENTION

The present invention solves the problems described above. For use in a power supply system where a plurality of hybrid vehicles can supply power to an electric load, it is an object of the present invention to prevent all of a plurality of vehicles from being driven by an internal combustion engine to avoid the influence of noise and exhaust gas.

A power supply system in a first aspect of the present invention includes a control device and can supply power to an external electrical apparatus. The power supply system allows a plurality of vehicles to be connected. Each of the plurality of vehicles includes an accumulator device and an internal combustion engine wherein, when power is supplied to the electrical apparatus, the vehicle can select one of a first mode, in which the internal combustion engine is driven to generate power, and a second mode in which the internal combustion engine is not driven. When power is supplied to the electrical apparatus, the control device controls at least one of the plurality of vehicles to operate in the second mode.

The control device may switch the vehicles from the second mode to the first mode based on a charge state of each of the accumulator devices mounted on the plurality of vehicles.

When a charge state of the accumulator device mounted on a vehicle, which stores more power among the plurality of vehicles, becomes smaller than a predetermined threshold, the control device may switch at least one of remaining vehicles to the first mode.

The control device may switch one of the plurality of vehicles, whose accumulator-device charge state becomes smaller than a reference value indicating a lower limit, to the first mode and, at the same time, switch one of the remaining vehicles, which is operating in the first mode and whose accumulator-device charge state is larger than the threshold, from the first mode to the second mode.

The control device may switch one of the plurality of vehicles, whose accumulator-device charge state becomes smaller than a reference value indicating a lower limit, to the first mode and, if remaining vehicles are operating in the first mode and the accumulator-device charge states of the vehicles are smaller than the threshold, controls all of the plurality of vehicles to operate in the first mode.

The control device may switch at least one of the plurality of vehicles to the first mode when a total of accumulator-device charge states of the plurality of vehicles becomes smaller than a predetermined threshold.

The threshold may be a value indicating an amount of power that allows the electrical apparatus to continuously operate for a predetermined time in a predetermined load state.

The control device may cause a vehicle of the plurality of vehicles, which operates in the first mode, to charge the accumulator device using at least a part of the power generated by the vehicle.

If there is a vehicle of the plurality of vehicles that operates in the first mode and a load increase rate of the electrical apparatus is higher than a predetermined value, the control device may control the vehicle which operates in the second mode to supply power corresponding to an increased load of the electrical apparatus.

The vehicle may include a rotary motor having Y-connected three-phase coils. The power from the vehicle is supplied to the electrical apparatus via neutral points of the three-phase coils.

The control device may be mounted on one of the plurality of vehicles.

A management device in a second aspect of the present invention manages power supplied from a plurality of vehicles, each including an internal combustion engine and an accumulator device, to an electrical apparatus external to the vehicles. The management device includes a control device that controls power supply from the plurality of vehicles. When power is supplied to the electrical apparatus, each of the plurality of vehicles selects one of a first mode, in which the internal combustion engine is driven to generate power, and a second mode in which the internal combustion engine is not driven. When power is supplied to the electrical apparatus, the control device controls at least one of the plurality of vehicles to operate in the second mode.

A vehicle in a third aspect of the present invention includes an internal combustion engine, a rotary motor that generates power using a driving force of the internal combustion engine, an accumulator device, and a control device that controls power supply to the electrical apparatus. When power is supplied to the electrical apparatus, the vehicle select one of a first mode, in which the internal combustion engine is driven to generate power, and a second mode in which the internal combustion engine is not driven. When power is supplied also from other vehicles (100A, 100B) to the electrical apparatus, the control device controls at least one of the plurality of vehicles including the vehicle and the other vehicles to operate in the second mode.

According to the aspects of aspects described above, the power supply system, capable of supplying power from a plurality of hybrid vehicles to an electric load, can reduce the state in which the internal combustion engines of all of the plurality of vehicles are driven. This system therefore can reduce the influence of noise and exhaust gas while power is supplied.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4A to FIG. 4D-2 are diagrams showing the outline of charging/discharging control in a first exemplary embodiment when two vehicles are used;

FIG. 5A to FIG. 5D-2 are diagrams showing the outline of charging/discharging control in the first exemplary embodiment when three vehicles are used;

DETAILED DESCRIPTION OF EMBODIMENTS

Figure 1:
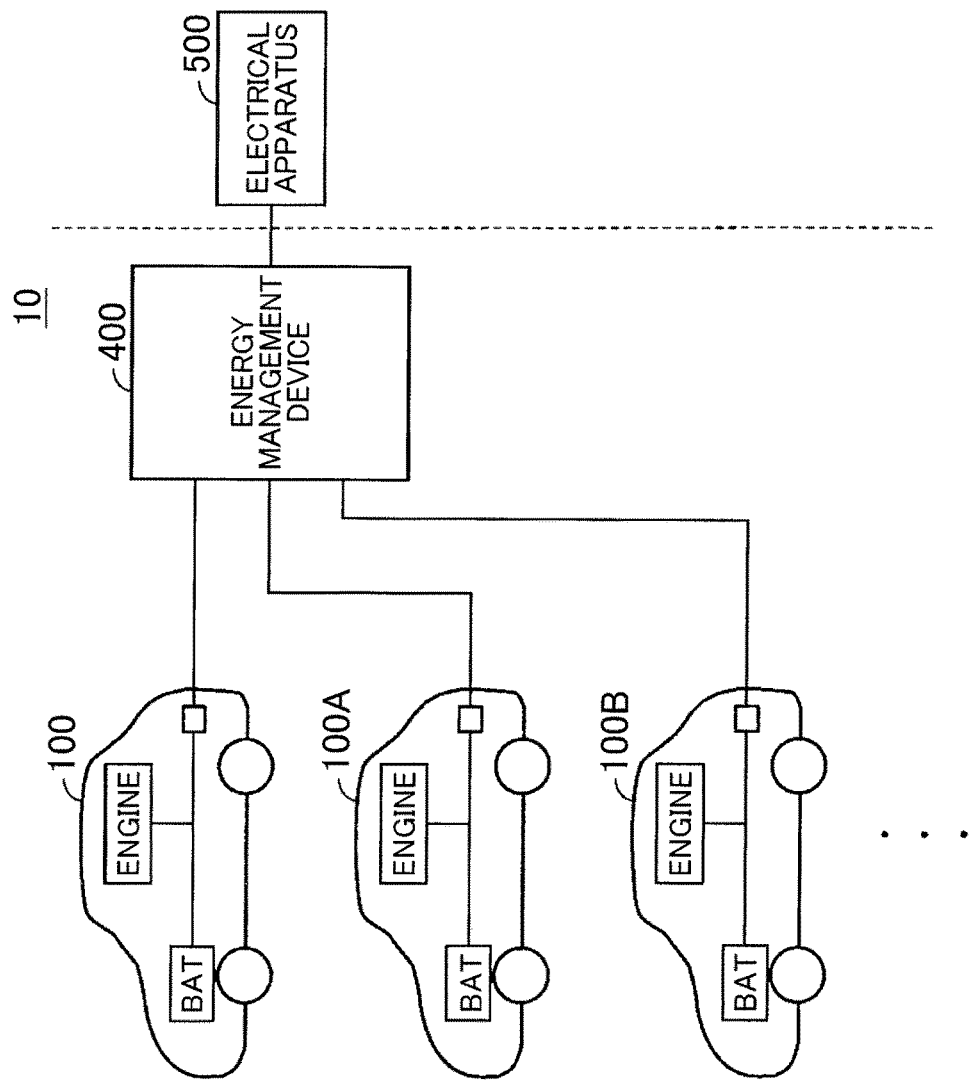
FIG. 1 is a general diagram showing a power supply system in an exemplary embodiment.

Exemplary embodiments of the present invention are described below in detail with reference to the drawings. In the drawings, the same reference numeral is given to components having the same or equivalent function and repetitive description will not be given.

(Basic configuration of power supply system) FIG. 1 is a general diagram showing a power supply system 10 in an exemplary embodiment. Referring to FIG. 1, a power supply system 10 includes an energy management device 400 to which a plurality of hybrid vehicles 100, 100A, and 100B can be connected. On each of these hybrid vehicles, an accumulator device (battery) and an engine, which is an internal combustion engine, are mounted. Each vehicle supplies power, stored in the accumulator device or generated using the output of the engine, to an electrical apparatus 500 via the energy management device 400.

The energy management device 400, an apparatus such as a Home Energy Management System (HEMS) installed in a home, controls the allocation of power to be output from each of the plurality of vehicles. The energy management device 400 determines in which mode the power is supplied, either the charged-power supply mode in which the power, stored in the accumulator device, is supplied with the engine of a vehicle stopped or the generated-power supply mode in which the power generated using the output of the engine is supplied.

In the example in FIG. 1, though the energy management device 400 is an apparatus separate from a vehicle, the similar control may be performed also by a control device included in the vehicle when the inter-vehicle communication is available for use.

In the example in FIG. 1, though three vehicles are connected as the power supply source, the exemplary embodiment is applicable when two or more vehicles are connected.

Figure 2:
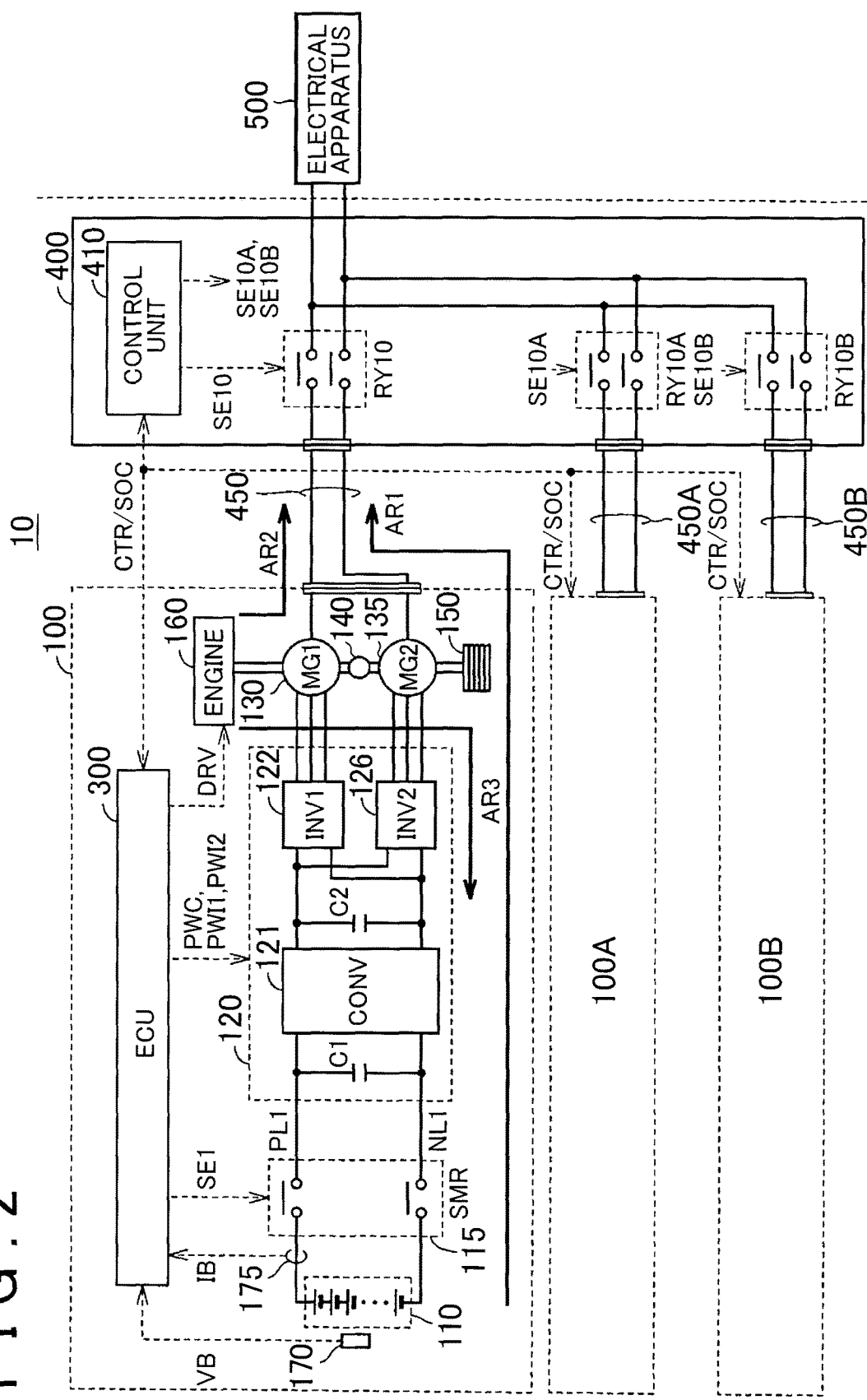
FIG. 2 is a diagram showing the detail of the vehicle and the energy management device shown in FIG. 1.

FIG. 2 is a diagram showing the detail of the vehicle 100 and the energy management device 400 shown in FIG. 1. Because the vehicles are similar in configuration, FIG. 2 shows only the configuration of a typical vehicle, the vehicle 100, but does not show the detailed configuration of the vehicles 100A and 100B. In the description below, the vehicle 100 is used as an example of the vehicle and the detailed description of the vehicles 100A and 100B is not repeated.

Referring to FIG. 2, the vehicle 100 includes an accumulator device 110, a system main relay (hereinafter also called an SMR) 115, a power control unit (PCU) 120 that works as a drive unit, motor generators 130 and 135, a power transmission gear 140, a driving wheel 150, an engine 160, and a control device (hereinafter also called Electronic Control Unit (ECU)) 300.

The accumulator device 110 is a power storage element that is chargeable/dischargeable. The accumulator device 110 includes secondary batteries such as lithium ion batteries, nickel-metal hydride batteries, or lead acid batteries, or power storage element cells such as electric double layer capacitors.

The accumulator device 110 is connected to the PCU 120, which drives the motor generators 130 and 135, via the SMR 115. The accumulator device 110 supplies the power, which generates the driving force of the vehicle 100, to the PCU 120. In addition, the accumulator device 110 accumulates the power generated by the motor generator 130. The output of the accumulator device 110 is, for example, 200V.

A voltage sensor 170 detects the voltage of the accumulator device 110 and outputs the detected value VB to the ECU 300. A current sensor 175 detects the current, input to and output from the accumulator device 110, and outputs the detected value IB to the ECU 300.

The SMR 115 includes two relays: one is a relay connected between the positive electrode of the accumulator device 110 and a power line PL1 and the other is a relay connected between the negative electrode of the accumulator device 110 and a power line NL1. The SMR 115, controlled by the control signal SE1 from the ECU 300, switches the supply and interruption of power between the accumulator device 110 and the PCU 120.

The PCU 120 includes a converter 121, inverters 122 and 126, and capacitors C1 and C2.

The converter 121 converts the voltage between the power lines PL1 and NL1 and the power lines PL2 and NL1 based on the control signal PWC received from the ECU 300.

The inverters 122 and 126 are connected in parallel with the power lines PL2 and NL1. The inverters 122 and 126 convert the DC power, supplied from the converter 121, to the AC power, based on the control signals PWI1 and PWI2 received from the ECU 300, for use in driving the motor generators 130 and 135.

The capacitor C1 is provided between the power lines PL1 and NL1 to reduce the voltage variation between the power lines PL1 and NL1. The capacitor C2 is provided between the power lines PL2 and NL1 to reduce the voltage variation between power lines PL2 and NL1.

The motor generators 130 and 135 are AC rotary motors, for example, a permanent magnetic synchronous motor containing a rotor in which a permanent magnet is embedded.

The output torque of the motor generators 130 and 135 is transmitted to the driving wheel 150 and the engine 160 via the power transmission gear 140, configured by the reduction gear and the power divider, to run the vehicle 100. During the regenerating braking operation of the vehicle 100, the motor generator 130 can generate power by the rotating force of the driving wheel 150. The PCU 120 converts the generated power to the charging power of the accumulator device 110.

The engine 160 is controlled by the control signal DRV received from the ECU 300. In one example, it is also possible to set up the configuration such that the motor generator 130 operates only as a generator that generates power by the operation of the engine 160 and that the motor generator 135 operates only as a motor that drives the driving wheel 150 to run the vehicle 100.

As will be described in FIG. 3 in detail, the neutral point of each of the motor generators 130 and 135 is connected in this exemplary embodiment to the energy management device 400 using a connector-detachable power cable 450. The neutral points are electrically connected to the electrical apparatus 500 via a relay RY10 included in the energy management device 400. This configuration allows generated power, generated when the motor generators 130 and 135 are operated by the engine 160, and/or the power, stored in the accumulator device 110, to be transmitted to the electrical apparatus 500 via the energy management device 400.

In the charged-power supply mode in which the power stored in the accumulator device 110 is supplied with the engine 160 stopped, the DC power of the accumulator device 110 is converted to AC power by the PCU 120 and supplied to the electrical apparatus 500 as indicated by the arrow AR1 in FIG. 2. On the other hand, in the generated-power supply mode in which the power generated by the engine 160 is supplied, the AC power generated by the power generation is supplied to the electrical apparatus 500 as indicated by the arrow AR2 in FIG. 2. In this case, a part of the AC power, generated by the power generation, is converted to DC power by the PCU 120 as indicated by the arrow AR3 in FIG. 2 for use as the power for charging the accumulator device 110.

The ECU 300, which includes a central processing unit (CPU), a storage device, and an I/O buffer all of which are not shown in FIG. 2, receives signals from the sensors and sends control signals to the apparatuses for controlling the vehicle 100 and the apparatuses. This control may be processed not only by software but also by special hardware (electronic circuit).

The ECU 300 receives the voltage VB and the current IB of the accumulator device 110 detected respectively by the voltage sensor 170 and the current sensor 175. Based on the voltage VB and the current IB, the ECU 300 calculates the state of charge (SOC) of the accumulator device 110.

The ECU 300 is configured so that wireless or wired communication can be performed with a control unit 410 included in the energy management device 400. The ECU 300 sends the SOC of the accumulator device 110 to the control unit 410 of the energy management device 400.

The ECU 300 receives the control signal CTR, which includes the information about the allocation of power to be output from each vehicle and the information about the power supply mode to be used by each vehicle, from the control unit 410. Based on the received information, the ECU 300 controls the PCU 120 and the engine 160.

The energy management device 400 includes the control unit 410 and relays RY10, RY10A, and RY10B. As described above, the relays RY10, RY10A, and RY10B are provided on the power transmission paths from the vehicles 100, 100A, and 100B to the electrical apparatus 500 respectively. The relays RY10, RY10A, and RY10B, which are controlled respectively by control signals SE10, SE10A, and SE10B received from the control unit 410, switch the supply and interruption of power from the vehicles to the electrical apparatus 500.

The energy management device 400 controls the allocation of power to be output from the vehicles based on a power requested received from the electrical apparatus 500. The energy management device 400 determines the power supply mode of each vehicle based on the SOC of the accumulator device of the vehicle.

Although not shown in FIG. 2, the energy management device 400 may further include a voltage transducer for converting a voltage, supplied from a vehicle, to a desired voltage.

Figure 3:
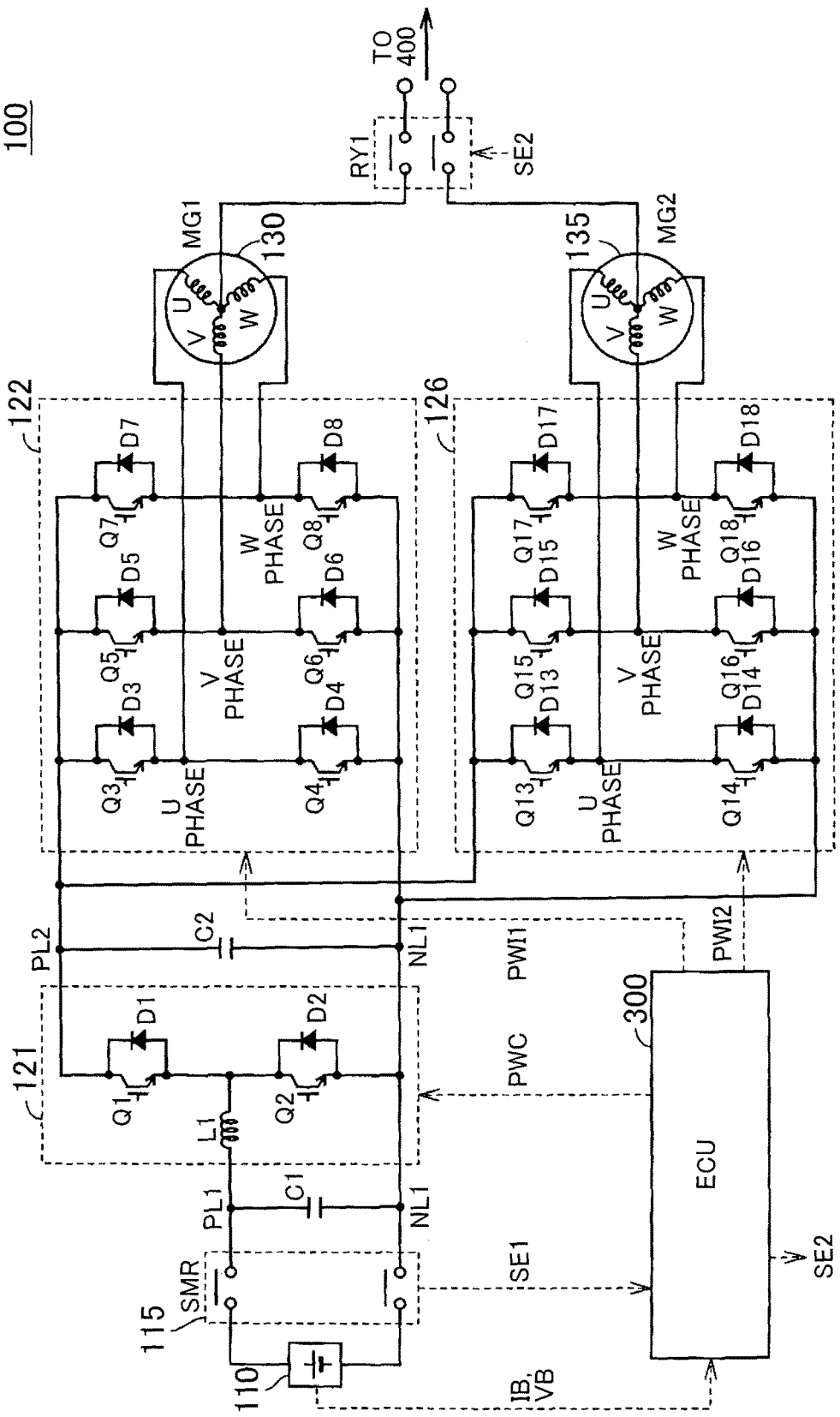
FIG. 3 is a diagram showing the detail of the electric circuit of the vehicle.

FIG. 3 is a diagram showing the detail of the electric circuit of the vehicle 100. The description is not repeated for an element in FIG. 3 that is included also in FIG. 2.

Referring to FIG. 3, the converter 121 includes switching elements Q1 and Q2, diodes D1 and D2, and a reactor L1.

The switching elements Q1 and Q2 are connected in series between the power lines PL2 and NL1 with the direction from the power line PL2 to the power line NL1 as the forward direction. Although an insulated gate bipolar transistor (IGBT) is used as an example of the switching element in this exemplary embodiment, a power metal oxide semiconductor (MOS) transistor or a power bipolar transistor may be used instead of the IGBT.

Reverse parallel diodes D1 and D2 are connected to the switching elements Q1 and Q2, respectively. One end of the reactor L1 is connected to the connection node between the switching elements Q1 and Q2, and the other end is connected to the power line PL1. That is, the converter 121 forms a chopper circuit.

The switching elements Q1 and Q2, which are controlled based on the control signal PWC received from the ECU 300, perform voltage conversion operation between the power lines PL1 and NL1 and the power lines PL2 and NL1.

Basically, the converter 121 is controlled such that, within each switching period, the switching elements Q1 and Q2 are turned on and off complementarily and alternately. During the step-up operation, the converter 121 steps up the DC voltage received from the accumulator device 110. This step-up operation is performed by supplying the electromagnetic energy, accumulated in the reactor L1 in the on-period of the switching element Q2, to the power line PL2 via the switching element Q1 and the reverse parallel diode D1.

During the step-down operation, the converter 121 steps down the DC voltage received from the inverters 122 and 126. This step-down operation is performed by supplying the electromagnetic energy, accumulated in the reactor L1 in the on-period of the switching element Q1, to the power line NL1 via the switching element Q2 and the reverse parallel diode D2.

The voltage conversion ratio in the step-up operation and the step-down operation is controlled by the on-period ratio (duty ratio) of the switching elements Q1 and Q2 in the switching period described above. When the step-up operation and the step-down operation are not necessary, the voltage conversion ratio may be set to 1.0 (duty ratio=100%) by setting the control signal PWC so that the switching elements Q1 and Q2 are set permanently to on or off.

The inverter 122 includes three arms, a U-phase arm 123, a V-phase arm 124, and a W-phase arm 125, which form a three-phase bridge circuit. The U-phase arm 123, V-phase arm 124, and W-phase arm 125 are connected in parallel between the power line PL2 and the power line NL1.

The U-phase arm 123 includes switching elements Q3 and Q4, which are connected in series between the power line PL2 and the power line NL1, and diodes D3 and D4 which are connected in parallel respectively with the switching elements Q3 and Q4. The cathode of the diode D3 is connected to the collector of the switching element Q3, and the anode of the diode D3 is connected to the emitter of the switching element Q3. The cathode of the diode D4 is connected to the collector of the switching element Q4, and the anode of the diode D4 is connected to the emitter of the switching element Q4.

The V-phase arm 124 includes switching elements Q5 and Q6, which are connected in series between the power line PL2 and the power line NL1, and diodes D5 and D6 which are connected in parallel respectively with the switching elements Q5 and Q6. The cathode of the diode D5 is connected to the collector of the switching element Q5, and the anode of the diode D5 is connected to the emitter of the switching element Q5. The cathode of the diode D6 is connected to the collector of the switching element Q6, and the anode of the diode D6 is connected to the emitter of the switching element Q6.

The W-phase arm 125 includes switching elements Q7 and Q8, which are connected in series between the power line PL2 and the power line NL1, and diodes D7 and D8 which are connected in parallel respectively with the switching elements Q7 and Q8. The cathode of the diode D7 is connected to the collector of the switching element Q7, and the anode of the diode D7 is connected to the emitter of the switching element Q7. The cathode of the diode D8 is connected to the collector of the switching element Q8, and the anode of the diode D8 is connected to the emitter of the switching element Q8.

The motor generator 130 is, for example, a three-phase AC motor generator including a rotor, in which a permanent magnet is embedded, and a stator having three-phase coils Y-connected at a neutral point. The three coils, U-phase, V-phase, and W-phase, each have one end connected in common to the neutral point. The U-phase coil has the other end connected to the connection node between the switching elements Q3 and Q4. The V-phase coil has the other end connected to the connection node between the switching elements Q5 and Q6. The W-phase coil has the other end connected to the connection node between the switching elements Q7 and Q8.

Basically, the inverter 126 and the motor generator 135 have the same configuration as that of the inverter 122 and the motor generator 130 respectively. Therefore, the detailed description of the configuration of the inverter 126 and the motor generator 135 is not repeated.

In such a configuration, through the inverters 122 and 126 and the reactor components of the U-phase coil, V-phase coil, and W-phase coil of the motor generators 130 and 135, the DC power of the accumulator device 110 can be converted to the single-phase AC power and output from the neutral points. In addition, the AC power generated by driving the motor generators 130 and 135 via the engine 160 can be supplied to the electrical apparatus 500 via the neutral points and, by rectifying by the inverters 122 and 126, can be converted to, the charging power of the accumulator device 110.

The neutral points of the motor generators 130 and 135 are connected, via a relay RY1, to the inlet (not shown) to which the power cable is connected. The relay RY1 is controlled by the control signal SE2, received from the ECU 300, to switch between the supply and interruption of power from the vehicle 100 to the external electrical apparatus 500.

First Embodiment

The engine is driven when the generated-power supply mode is selected in a hybrid vehicle so that the one described above, vibrations, noises, and exhaust gas are generated. Therefore, from the viewpoint of an influence on the environment, it is desirable to use the charged-power supply mode that does not involve 20 the operation of the engine.

In addition, the generated-power supply mode is less responsive to a load variation than the charged-power supply mode. This means that, if the increase rate of requested power from the load is high, the supply power may not be available sufficiently. Thus, when considering a sudden increase in a power request from the load, it is desirable for a hybrid vehicle, which is the power supply source, to maintain a SOC (charge amount) at a level equal to or higher than the predetermined level.

However, to charge the accumulator device or to continually satisfy the requirements of power from the load, the generated-power supply mode must be selected according to the circumstances.

To address this problem, the first exemplary embodiment provides a power supply system in which a plurality of hybrid vehicles are used as the power supply source, wherein charging/discharging control is performed so that the accumulator device can maintain the SOC, high enough to satisfy a sudden request for power from the load, while minimizing the number of vehicles on which the generated-power supply mode is selected.

FIG. 4A to FIG. 4D-2 are diagrams showing the outline of charging/discharging control in the first exemplary embodiment when two hybrid vehicles are used. The vertical axis in each graph in FIG. 4A to FIG. 4D-2 indicates the charged power amounts of the accumulator devices BAT1 and BAT2 of the two vehicles in a particular state. Although the accumulator devices of the two vehicles have the same capacity in FIG. 4A to FIG. 4D-2 for the sake of description, the accumulator devices of the vehicles need not have the same capacity.

Referring to FIG. 4A to FIG. 4D-2, S1 to S3 on the vertical axis of each graph indicate the following: S1 indicates the lower-limit charge amount of the accumulator device, S2 indicates the charge amount by which the electrical apparatus can continuously be operated for a predetermined time (for example, one hour) in the maximum load state, and S3 indicates the charge amount indicating the fully charged state. When the charge amount has decreased to S1, the engine is driven to place the vehicle in the generated-power supply mode in which the accumulator device is charged. When the charge amount has increased to S3, the charging of the accumulator device is stopped and the mode is switched to the charged-power supply mode.

Note that the values of S1 and S3 depend on the capacity of the accumulator device. The vertical axis, which indicates the charge amount in FIG. 4A to FIG. 4D-2, may also indicate the SOC (State Of Charge). When the vertical axis indicates the SOC, note that the threshold corresponding to S2 varies according to the capacity of the accumulator device.

Figure 4A:
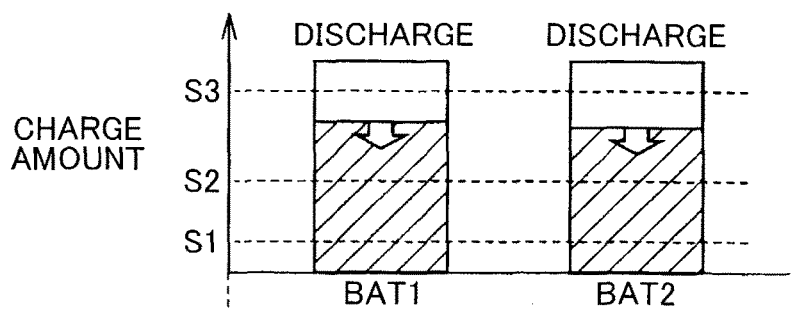
Figure 4B:
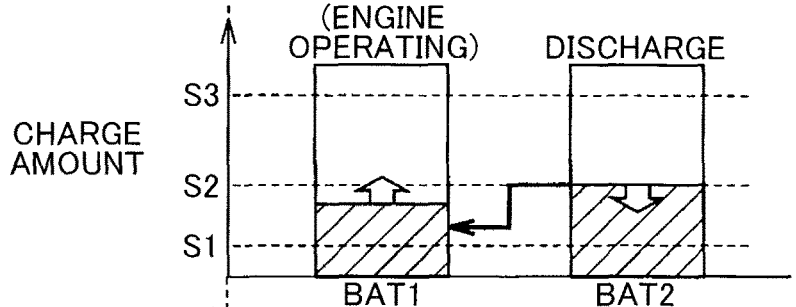

FIG. 4A indicates that the accumulator devices BAT1 and BAT2 have a sufficient charge amount (>S2). When the supply of power to the load is started in this state, the power is supplied from both accumulator devices according to the predetermined allocation ratio. That is, the charged-power supply mode is selected on both vehicles.

After that, the power supply is continued and the charge amount of the accumulator devices BAT1 and BAT2 gradually decreases. When the charge amount of the accumulator device (BAT2) of one of the vehicles with a larger residual charge amount has decreased to S2, the power supply mode of the other vehicle is forced to be switched to the generated-power supply mode even if the charge amount of that vehicle has not yet decreased to S1. This mode switching causes the power, generated by the vehicle on which the accumulator device (BAT1) is mounted, to be supplied to the electrical apparatus and, at the same time, starts charging the accumulator device (BAT1). The accumulator device is charged in this manner to allow one of the accumulator devices to have a charge amount large enough to operate the load for a predetermined time in the maximum load state.

If, before the charge amount of the accumulator device of one of the vehicles with a larger residual charge amount decreases to S2, the charge amount of the accumulator device of the other vehicle has decreased to S1, the other vehicle may be switched to the generated-power supply mode when the charge amount reaches S1. Alternatively, if the power can be supplied only by the accumulator device of the vehicle with a larger residual charge amount, it is also possible to stop the power supply of the other vehicle until the charge amount of the accumulator device of the vehicle with a larger residual charge amount decreases to S2 and, when the charge amount reaches S2, switch the other vehicle to the generated-power supply mode.

After that, if the power supply is continued, the charge amount of the accumulator device BAT2 further decreases; on the other hand, the accumulator device BAT1 is charged by the operation of the engine and its charge amount gradually increases. When the charge amount of the accumulator device BAT2 has decreased to the lower limit S1, the vehicle with the accumulator device BAT2 is switched to the generated-power supply mode and, at the same time, the vehicle with the accumulator device BAT1 is switched to the charged-power supply mode even if the accumulator device BAT1 is not fully charged (FIG. 4C).

Figure 4C:
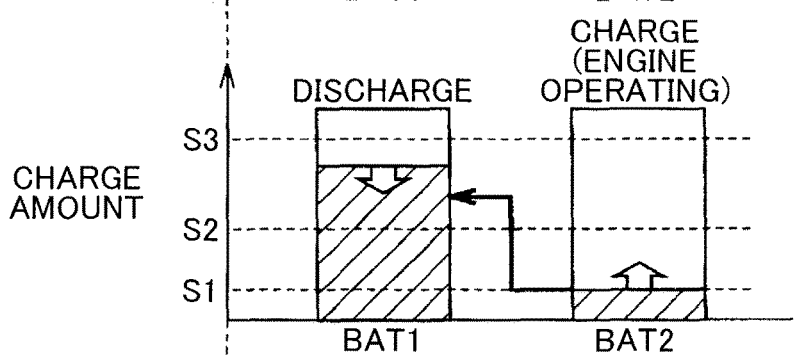
Figures 1, 4D:
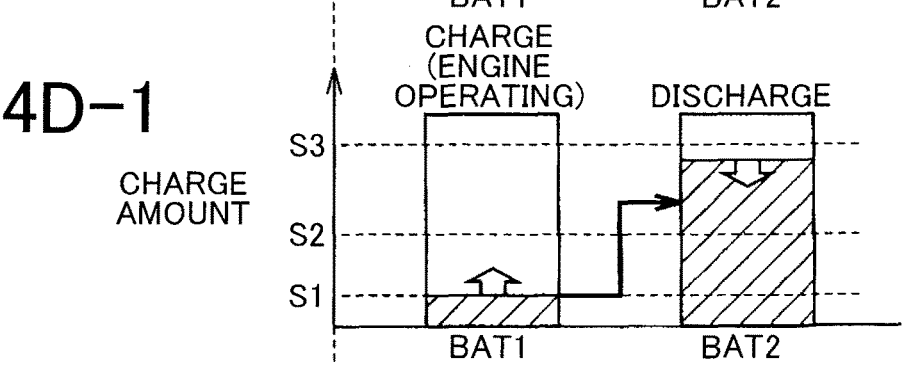
Figures 2, 4D:
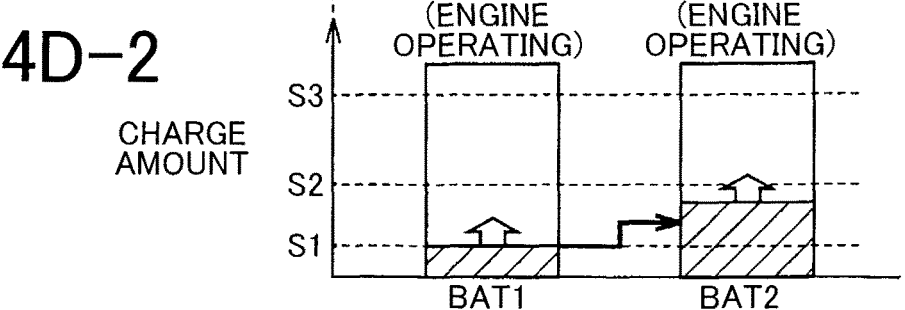

After that, when the charge amount of the accumulator device BAT1 of the vehicle in the charged-power supply mode has decreased to S1, the vehicle with the accumulator device BAT1 is switched to the generated-power supply mode and, at the same time, the vehicle with the accumulator device BAT2 is switched to the charged-power supply mode (FIG. 4D-1).

In the cases shown in FIG. 4C and FIG. 4D-1, before the charge amount of the accumulator device of one vehicle in the charged-power supply mode decreases to S1, the charge amount of the accumulator device of the other vehicle (that is, the vehicle in the generated-power supply mode) sometimes reaches S3 (fully charged). In such a case, the other vehicle is switched from the generated-power supply mode to the charged-power supply mode when the charge amount reaches S3.

The state shown in FIG. 4C and FIG. 4D-1 is that, when the charge amount of the accumulator device of one of the vehicles has decreased to S1, the charge amount of the accumulator device of the other vehicle is larger than S2. However, in some cases, when the charge amount of the accumulator device of one vehicle has decreased to S1, the charge amount of the accumulator device of the other vehicle has not yet recovered to S2. In such a case, to secure a total charge amount large enough to satisfy the required power, both vehicles are placed in the generated-power supply mode as shown in FIG. 4D-2 to charge the accumulator devices BAT1 and BAT2. When both vehicles are placed in the generated-power supply mode in this manner, the charging of each vehicle is continued until the charge amount of the accumulator device reaches S3 that is the fully-charge threshold. In this case, because both vehicles operate in the generated-power supply mode, a state may be generated in which the power cannot be supplied properly in response to a sudden increase/decrease in the load such as the one described above. Considering this state, an additional restriction may be placed on the load when both vehicles are placed in the generated-power supply mode.

As described above, the power supply mode of the two hybrid vehicles is switched considering the charge state of the accumulator devices. Switching the power supply mode in this manner can avoid as much as possible the situation in which the engines of both vehicles are driven at the same time while securing a charge amount large enough to respond to load variations.

Although two hybrid vehicles are used as the power supply source in FIG. 4A to FIG. 4D-2, this exemplary embodiment is applicable when more than two vehicles are used. FIG. 5A to FIG. 5D-2 are diagrams showing examples in which three hybrid vehicles are used as the power supply source.

Figure 5A:
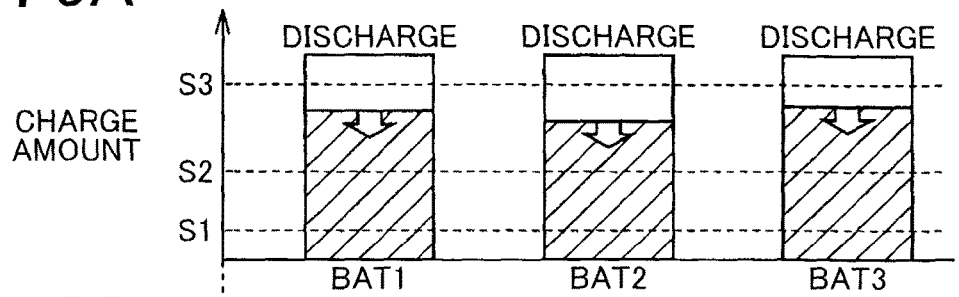

Referring to FIG. 5A to FIG. 5D-2, charging/discharging control performed when three hybrid vehicles are used is described. FIG. 5A shows the state in which all accumulator devices are sufficiently charged as in FIG. 4A (in this example, BAT1, BAT2, and BAT3 of the three vehicle). In this case, all vehicles are placed in the charged-power supply mode.

Figure 5B:
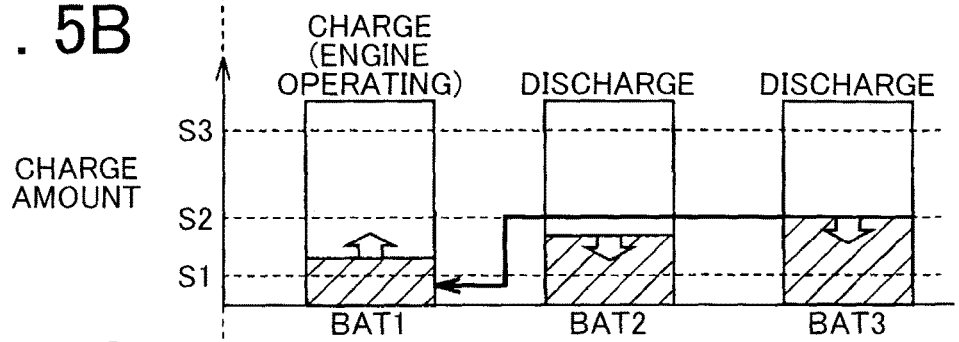

When the charge amount of the accumulator device (BAT3) with the largest charge amount of the three vehicles has decreased to S2, the vehicle of the accumulator device (BAT1) with the smallest charge amount is switched to the generated-power supply mode in which the accumulator device BAT1 is charged (FIG. 5B).

Figure 5C:
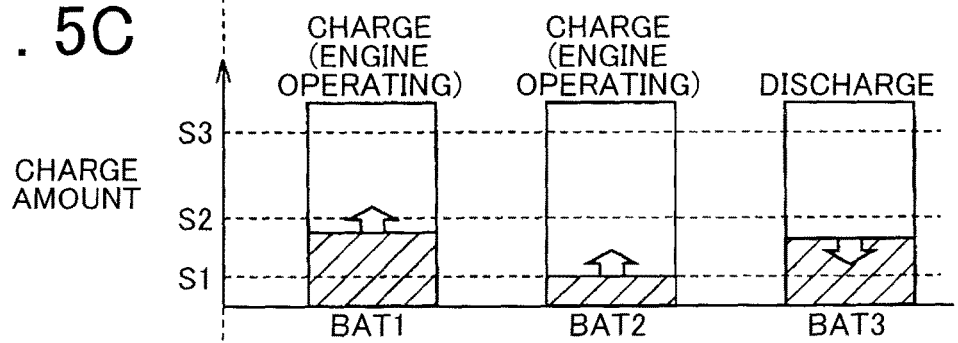

And, when the charge amount of the accumulator device (BAT2) of one of the vehicles in the charged-power supply mode has decreased to the lower-limit charge amount S1, the vehicle is switched to the generated-power supply mode in which the accumulator device BAT2 is charged (FIG. 5C).

Figures 1, 5D:
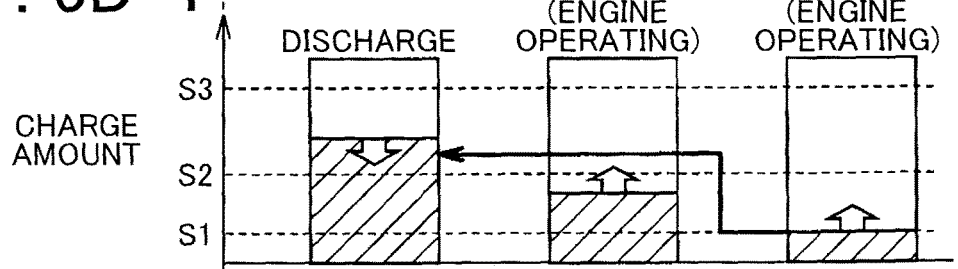
Figures 2, 5D:
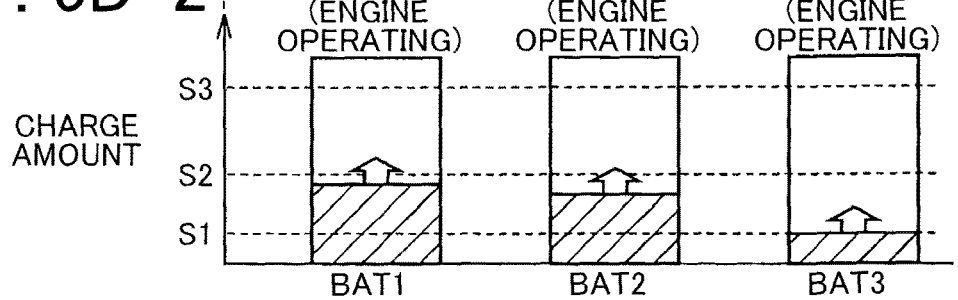

After that, the power supply is continued and, when the charge amount of the accumulator device BAT3 has decreased to S1, the vehicle with the accumulator device BAT3 is switched to the generated-power supply mode and, at the same time, the vehicle with the accumulator device (BAT1) having the largest charge amount is switched to the charged-power supply mode (FIG. 5D-1).

Thereafter, when the charge amount of a vehicle in the charged-power supply mode has decreased to S1, a vehicle with the accumulator device having the largest charge amount is switched from the generated-power supply mode to the charged-power supply mode.

Performing control in this manner can avoid as much as possible the situation in which the engines of all vehicles are driven at the same time while securing a total charge amount large enough to satisfy the required power.

When the charge amount of the only one accumulator device (BAT3) that has been operating in the charged-power supply mode has decreased to S1 as shown in FIG. 5D-2 and, as a result, the power supply mode is switched from the charged-power supply mode to the generated-power supply mode, it is possible that the charge amount of the accumulator device (BAT1) having the largest charge amount among the other vehicles operating in the generated-power supply mode has not yet recovered to S2. In other words, it is possible that the charge amounts of all vehicles are smaller than S2. In such a case, all vehicles are placed in the generated-power supply mode to secure a total charge amount large enough to satisfy the required power. In this case, charging is continued in each vehicle until the charge amount of the accumulator device of the vehicle becomes the fully charged state S3.

As described above, the control similar to that performed for two vehicles is applicable when three hybrid vehicles are used as the power supply source.

Figure 6A:
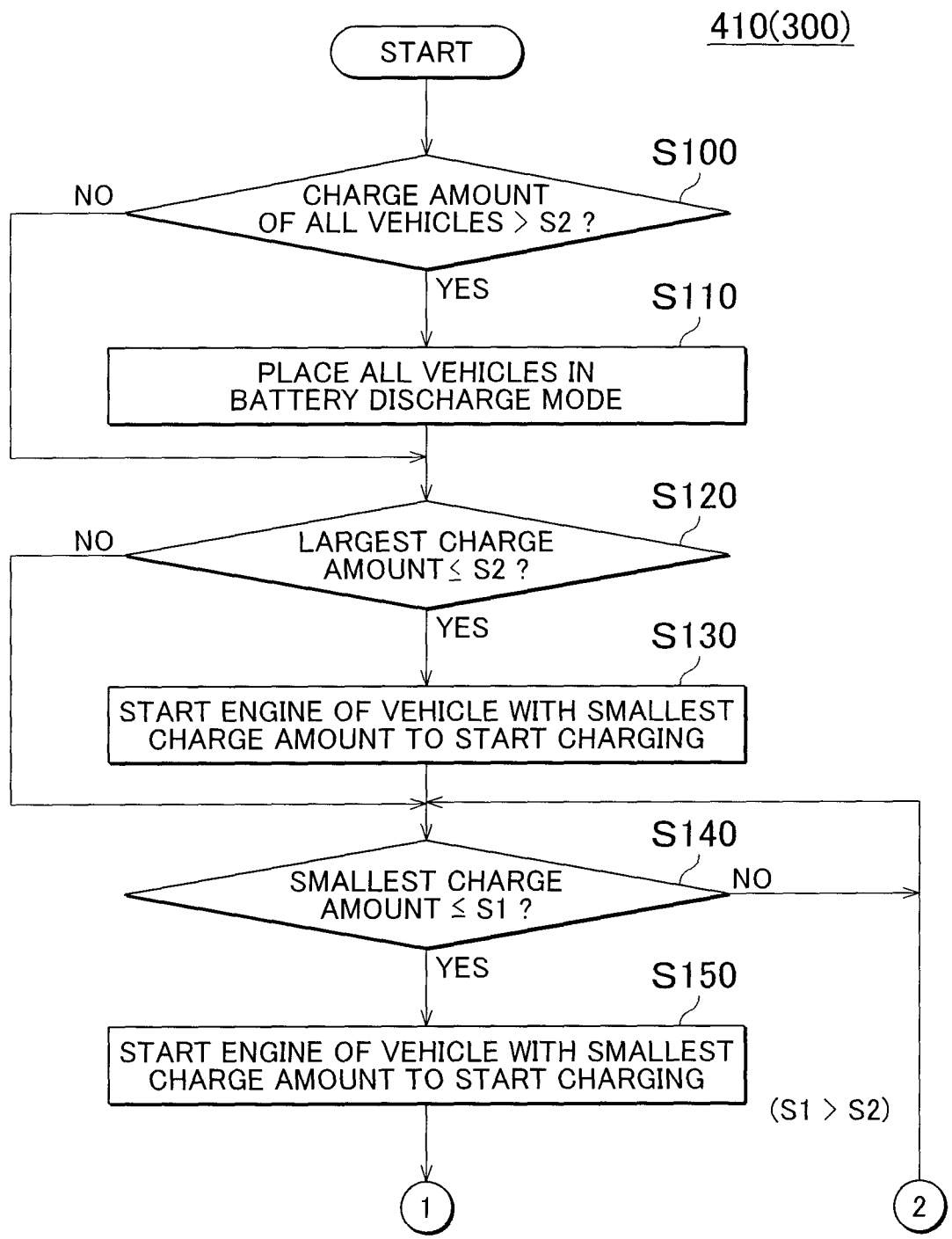
FIGS. 6A and 6B are a flowchart showing the charging/discharging control processing in the first exemplary embodiment.
Figure 6B:
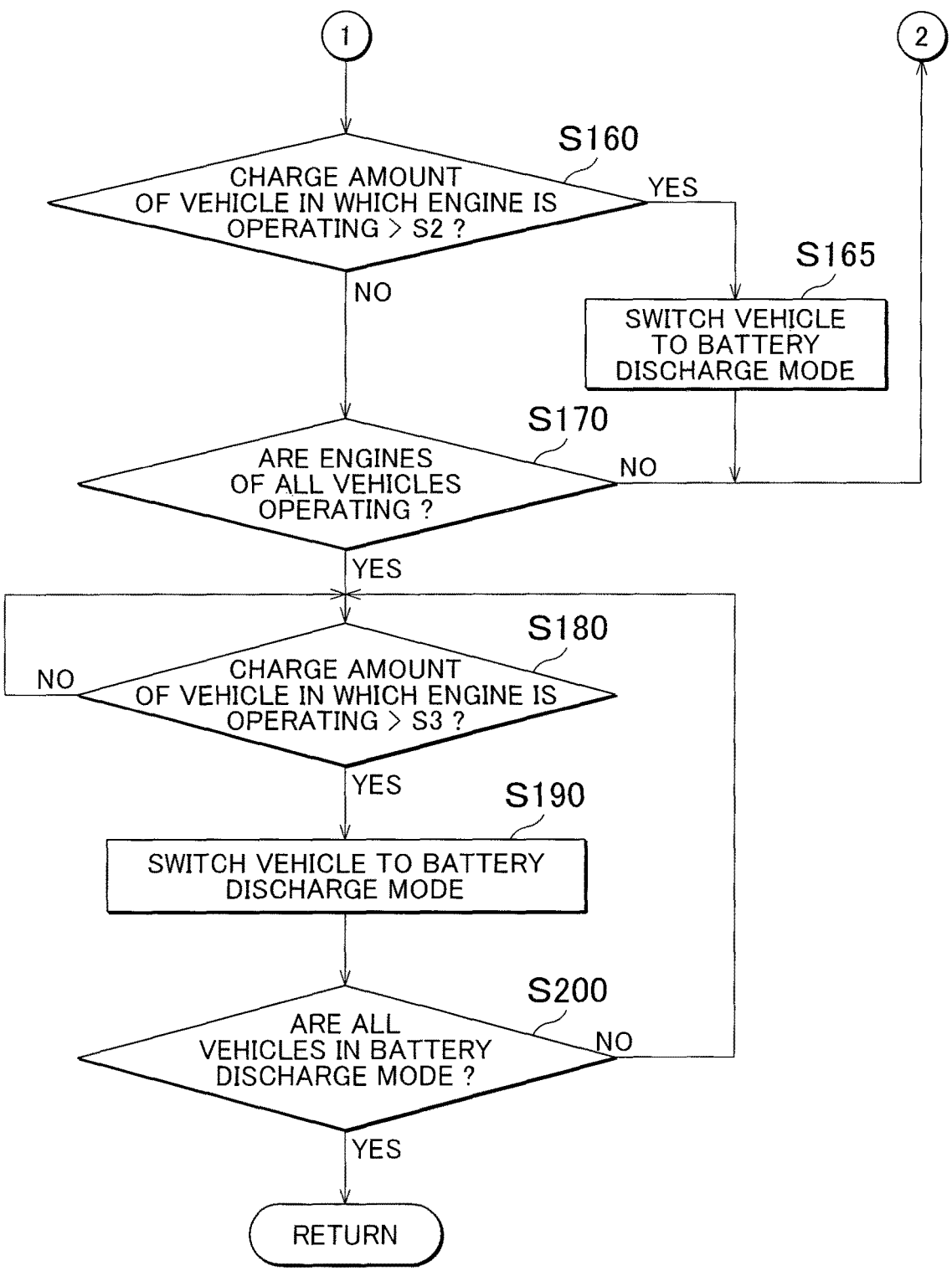

FIGS. 6A and 6B are a flowchart showing the charging/discharging control processing in the first exemplary embodiment. As described above, the charging/discharging control processing may be executed by the control unit 410 of the energy management device 400 shown in FIG. 2 or, when the inter-vehicle communication is available for use, by the ECU 300 in one of the vehicles. The main routine calls the program stored in advance in the control unit 410 or the ECU 300, and the called program executes each step in the flowchart in FIGS. 6A, 6B and FIG. 11 described later when a predetermined period elapses or a predetermined condition is satisfied. The processing of some steps may also be implemented by building special hardware (electronic circuit).

The following describes an example in which the steps are executed by the control unit 410 of the energy management device 400. In the description below, the state of the charged-power supply mode is also called "battery discharge mode".

Referring to FIG. 2, FIGS. 6A and 6B, when the supply of power to the load (electrical apparatus 500) is started, the control unit 410 determines in step 100 (hereinafter "step" is abbreviated to S) whether the charge amount of the accumulator devices of all vehicles is larger than the threshold S2 that is a charge amount large enough to run the electrical apparatus 500 in the maximum load state continuously for a predetermined time.

If the charge amount of all vehicles is larger than S2 (YES in S100), the processing proceeds to S110 in which the control unit 410 places all vehicles in the charged-power supply mode (battery discharge mode). On the other hand, if the charge amount of at least one of the vehicles is equal to or smaller than S2 (NO in S100), S110 is skipped and the processing proceeds to S120.

In S120, the control unit 410 determines whether the charge amount of the accumulator device having the largest charge amount of all vehicles is equal to or smaller than S2. If the largest charge amount is equal to or smaller than S2 (YES in S120), the processing proceeds to S130. In S130, the control unit 410 switches the power supply mode of the vehicle with the accumulator device having the smallest charge amount from the charged-power supply mode to the generated-power supply mode. This mode switching starts the engine of the vehicle to charge the accumulator device.

On the other hand, if the largest charge amount is larger than S2 (NO in S120), S130 is skipped. The control unit 410 keeps all vehicles in the charged-power supply mode. After that, the processing proceeds to S140.

In S140, the control unit 410 determines whether the charge amount of the vehicle with the accumulator device having the smallest charge amount is equal to or smaller than the threshold S1 that indicates the lower limit.

If the smallest charge amount is larger than S1 (NO in S140), the processing returns to S140. The control unit 410 keeps the power supply mode of each vehicle until the smallest charge amount becomes equal to or smaller than S1.

If the smallest charge amount becomes equal to or smaller than S1 (YES in S140), the processing proceeds to S150. In S150, the control unit 410 switches the vehicle with the smallest charge amount from the charged-power supply mode to the generated-power supply mode and starts charging the accumulator device of the vehicle. After that, the control unit 410 determines in S160 whether the charge amount of the vehicle, now placed in the generated-power supply mode in which the engine is running, has recovered to a level higher than the threshold S2.

If the charge amount of the vehicle in which the engine is running is larger than S2 (YES in S160), the processing proceeds to S165. In S165, the control unit 410 stops the engine of the vehicle whose charge amount has recovered to S2 and then switches the power supply mode from the generated-power supply mode to the charged-power supply mode. After that, the processing returns to S140.

On the other hand, if the charge amount of the vehicle in which the engine is running is still equal to or smaller than S2 (NO in S160), the control unit 410 determines in S170 whether all vehicles are placed in the generated-power supply mode.

If all vehicles are not in the generated-power supply mode but at least one vehicle still remains in the charged-power supply mode (NO in S170), the processing returns to S140. The control unit 410 repeats the processing from S140 to S170.

On the other hand, if all vehicles are in the generated-power supply mode (YES in S170), the processing proceeds to S180. In S180, the control unit 410 determines whether the charge amount of at least one vehicle has recovered to a level larger than S2.

If the charge amounts of all vehicles have not yet recovered to S2 (NO in S180), the processing returns to S180. The control unit 410 continues charging the accumulator device (s) with all vehicles placed in the generated-power supply mode.

If the charge amount of at least one vehicle has recovered to S2 (YES in S180), the processing proceeds to S190. In S190, the control unit 410 switches the vehicle, whose charge amount has recovered, from the generated-power supply mode to the charged-power supply mode. After that, the control unit 410 determines in step S200 whether all vehicles have been switched to the charged-power supply mode.

If at least one vehicle still remains in the generated-power supply mode (NO in S200), the processing proceeds to S180. The control unit 410 continues charging the accumulator device of the vehicle until the charge amount recovers to S2.

On the other hand, if all vehicles are switched to the charged-power supply mode (YES in S200), the processing returns to the main routine and the processing is performed beginning with the first step (S100).

Although not shown in the flowchart in FIGS. 6A and 6B, if the accumulator device becomes fully charged while being charged in the generated-power supply mode, the vehicle is switched at that moment from the generated-power supply mode to the charged-power supply mode.

The power supply system, which includes a plurality of hybrid vehicles each capable of supplying power to an external apparatus in the charged-power supply mode and the generated-power supply mode, performs control according to the processing described above. This power supply system can avoid as much as possible the situation in which the engines are started while at the same time securing a charge amount responsive to a sudden variation in the load. This can reduce an influence on the environment, which may be caused by the operation of the engines, while ensuring the stable operation of the load.

In the above description, the charge amount of each accumulator device is compared with the threshold S2 to determine whether the accumulator device has a charge amount large enough to respond to load variations. Instead of this comparison, it is also possible to compare the total of the charge amounts of a plurality of accumulator devices with the threshold S2 for use in determination.

Second Exemplary Embodiment

In the first exemplary embodiment, an example of configuration has been described in which power is supplied by two hybrid vehicles. In this configuration, if the charge amount of one of the vehicles has decreased to the lower limit S1 and the vehicle is switched to the generated-power supply mode and, at this time, the charge amount of the other vehicle is lower than the threshold S2, both vehicles are placed in the generated-power supply mode (FIG. 4D-2).

However, as described above, the generated-power supply mode is less responsive to load variations than the charged-power supply mode. This means that, when all vehicles are placed in the generated-power supply mode, there is a possibility that, when the load varies, power cannot be supplied appropriately or restrictions must be placed on the load.

To address this problem, the second exemplary embodiment is configured so that at least one vehicle has a charge amount large enough to respond to sudden load variations and stays in the charged-power supply mode.

Figure 7:
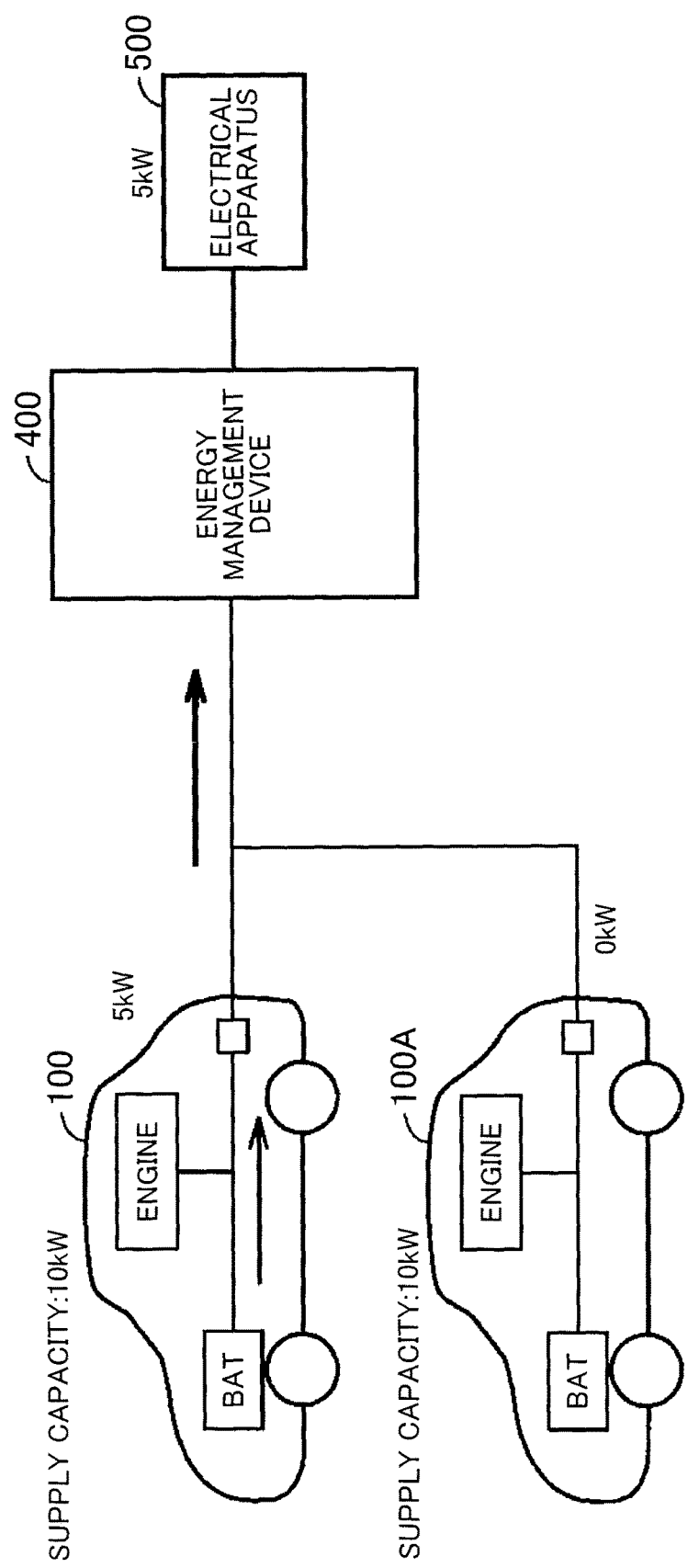
FIG. 7 is a first diagram showing the outline of charging/discharging control in a second exemplary embodiment.
Figure 8:
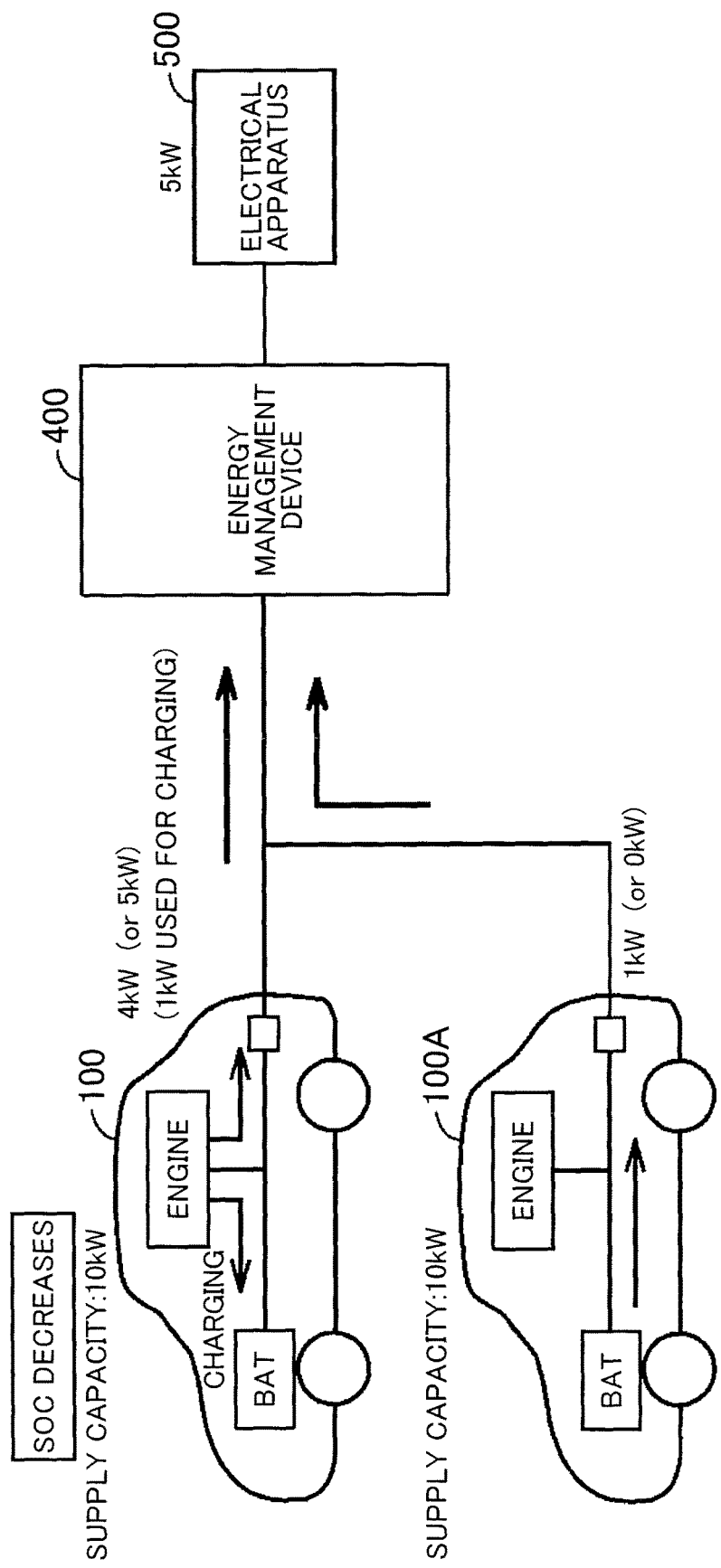
FIG. 8 is a second diagram showing the outline of charging/discharging control in the second exemplary embodiment.
Figure 9:
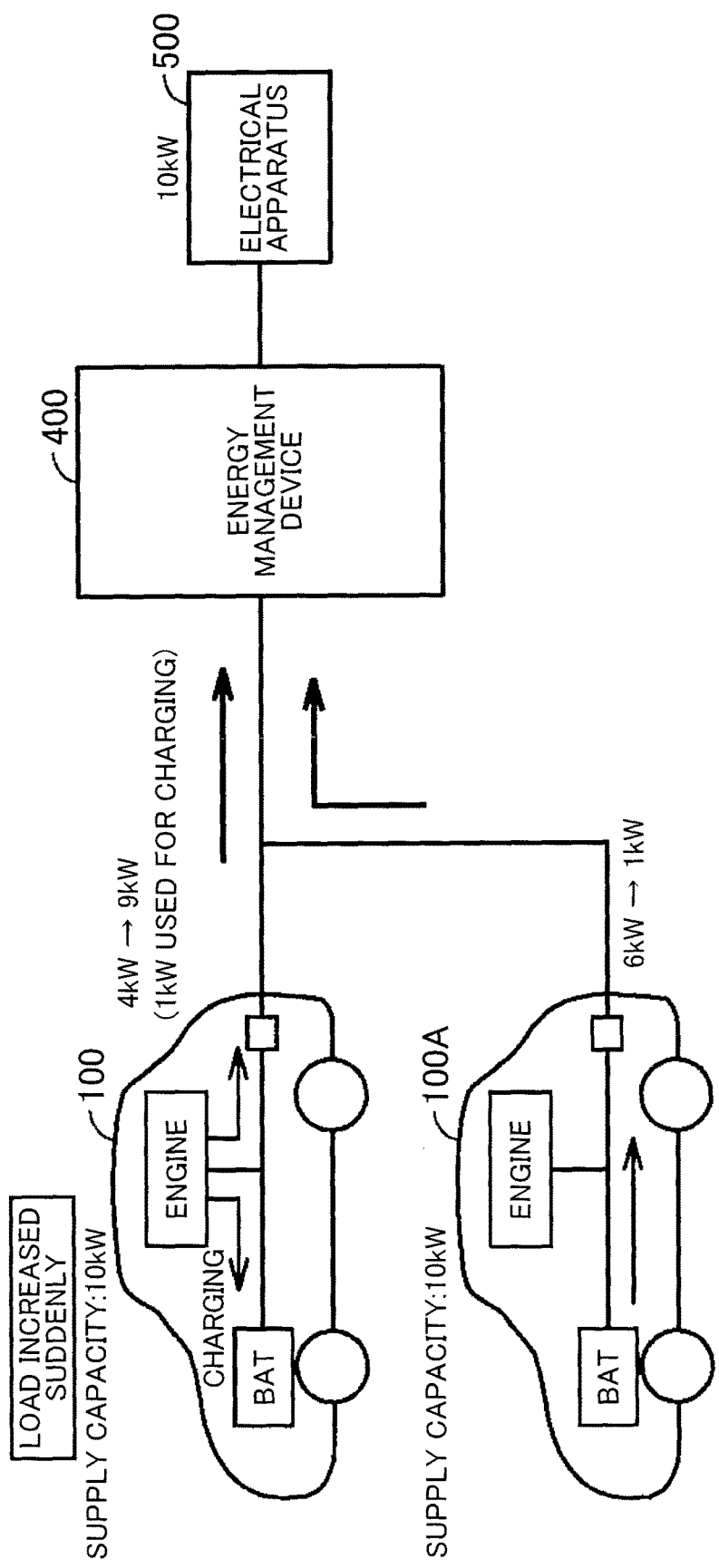
FIG. 9 is a third diagram showing the outline of charging/discharging control in the second exemplary embodiment.

FIG. 7 to FIG. 9 are diagrams showing the outline of charging/discharging control in the second exemplary embodiment. Although FIG. 7 to FIG. 9 show examples in which two hybrid vehicles are used as the power supply source for the sake of description, the second exemplary embodiment is applicable also when more than two hybrid vehicles are used.

In FIG. 7, assume that the maximum power supply capacity of vehicles 100 and 100A is 10 kW and that the power required by an electrical apparatus 500 is 5 kW. When the two vehicles 100 and 100A have a sufficient charge amount (>S2), power is supplied only from one of the vehicles (for example, vehicle 100) to the electrical apparatus 500 in the charged-power supply mode with the other vehicle (vehicle 100A) placed in the standby state.

After that, when the charge amount (SOC) of the vehicle 100 has decreased to the lower threshold S1, the vehicle 100 is switched from the charged-power supply mode to the generated-power supply mode. In the charged-power supply mode, power is supplied to the electrical apparatus 500 using the generated power, with a part of the generated power supplied to the accumulator device for charging (FIG. 8). At the same time, the vehicle 100A is placed in the state ready for promptly responding to load variations.

At this time, the vehicle 100A operates in one of the following two states. In one state, the vehicle 100A supplies the minimum output power (for example, 1 kW) to the electrical apparatus 500; in the other state, when the inverter may be started promptly, the vehicle 100A does not supply power to the electrical apparatus 500. In other words, when the vehicle 100A supplies the minimum output power (1 kW), the vehicle 100 supplies the remaining power (4 kW) to the electrical apparatus 500. On the other hand, when the vehicle 100A does not supply power, the vehicle 100 supplies the 5 kW power to the electrical apparatus 500.

After that, when the load increases suddenly to 10 kW (FIG. 9), the generated-power supply mode may not respond appropriately in a time domain where the load variation rate is high. In such a transient time domain, the vehicle 100A, which is in the charged-power supply mode, outputs the power (+5 kW) additionally requested by the electrical apparatus 500. That is, when the vehicle 100A already outputs the minimum output (1 kW) in FIG. 8, the vehicle 100A supplies the total of 6 kW power to the electrical apparatus 500. The vehicle 100 supplies the 4 kW power of the generated power (5 kW) to the electrical apparatus 500, with 1 kW power used to charge the accumulator device as in FIG. 8.

After that, when the transient time domain is terminated and the load becomes stable at 10 kW, the vehicle 100 supplies the 9 kW power to the electrical apparatus 500 and the vehicle 100A supplies the remaining power of 1 kW to the electrical apparatus 500.

Figure 10:
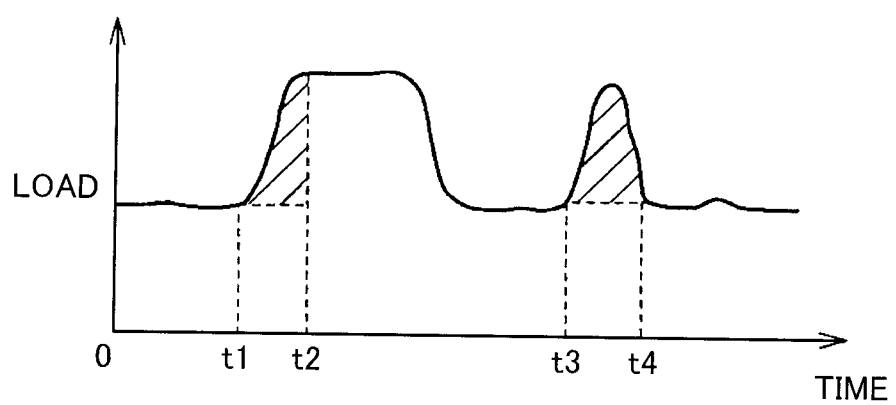
FIG. 10 is a diagram showing load variations and power allocation when charging/discharging control in the second exemplary embodiment is used.

FIG. 10 is a diagram showing charging/discharging control in the above-described second exemplary embodiment in terms of load variations over time. In FIG. 10, the vertical axis indicates the load (requested power) and the horizontal axis indicate the time.

Referring to FIG. 10, the load is almost constant to time t1. In this state, the vehicle 100 supplies power to the load as shown in FIG. 7 and FIG. 8. When the load increases suddenly at time t1 and, at this time, the current power supply mode of the vehicle 100 is the charged-power supply mode (FIG. 7), the vehicle 100 supplies the additionally requested power in the transient period during which the load increases (hatched part between time t1 to time t2 in FIG. 10). On the other hand, when the current power supply mode of the vehicle 100 is the generated-power supply mode (FIG. 8), the vehicle 100A, which is the other vehicle in the charged-power supply mode, supplies the additionally requested power in the transient period (FIG. 9).

When the load becomes stable in the increased-load state and the vehicle 100 becomes ready for supplying power (time t2), the increased amount of load is supplied also by the vehicle 100. When the load is decreased, the supplied power does not become insufficient and therefore the vehicle 100A does not supply power.

When the load is increased and decreased in a short period as in the time period t3 to t4 in FIG. 10, the vehicle 100A supplies power also in the transient period during which the load is decreased.

Figure 11:
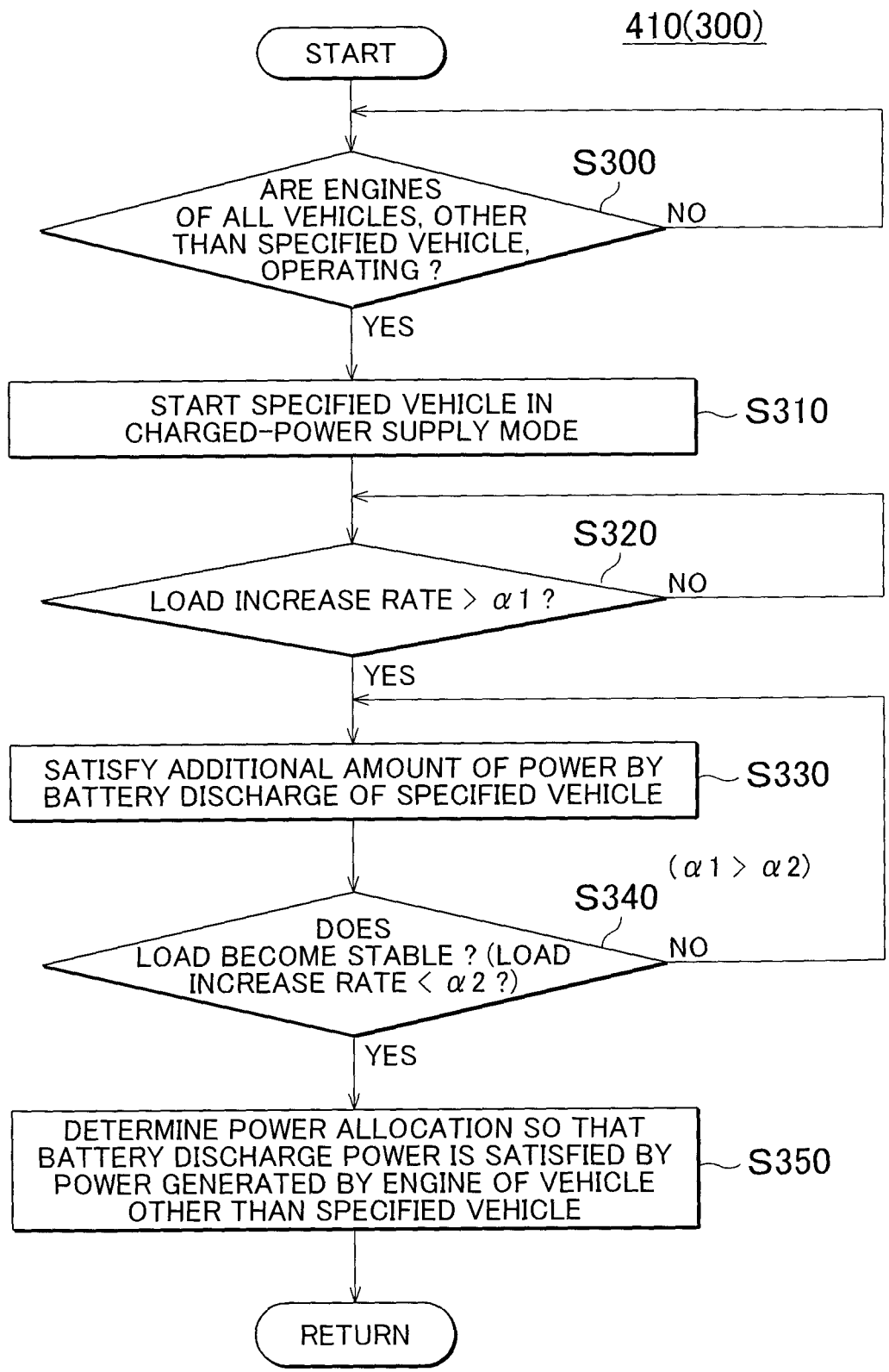
FIG. 11 is a flowchart showing the charging/discharging control processing in the second exemplary embodiment.

FIG. 11 is a flowchart showing the charging/discharging control processing in the second exemplary embodiment.

In FIG. 11, when the supply of power to an electrical apparatus is started, the control unit 410 determines in S300 whether all vehicles other than the vehicle, which is specified as a standby vehicle as described above, are placed in the generated-power supply mode.

If all vehicles other than the specified vehicle are not placed in the generated-power supply mode, that is, if at least one of the vehicles is placed in the charged-power supply mode (NO in S300), the processing returns to S300.

If all vehicles other than the specified vehicle are placed in the generated-power supply mode (YES in S300), the processing proceeds to S310 in which the control unit 410 starts the specified vehicle in the charged-power supply mode. In this case, the specified vehicle may supply a minimum output of power or, if power can be supplied responsively, may stay in the power-stopped state.

In S320, the control unit 410 determines whether the load increase rate of the electrical apparatus has increased to a value higher than the predetermined threshold $\alpha 1$. This threshold $\alpha 1$ is defined based on a power change rate at which a vehicle in the generated-power supply mode can respond.

If the load increase rate is equal to or lower than the threshold $\alpha 1$ (NO in S320), the processing returns to S320 and the control unit 410 determines the power allocation so that the power, requested by the electrical apparatus, is supplied by the power from the vehicle in the generated-power supply mode.

If the load increase rate is higher than the threshold $\alpha 1$ (YES in S320), the power generated by the engine may not satisfy the requested amount of power appropriately. Therefore, the control unit 410 passes control to S330 to determine the power allocation so that the amount of suddenly requested power is satisfied by the power from the accumulator device of the specified vehicle.

After that, the control unit 410 determines in S340 whether the load variations become stable and the load increase rate becomes lower than the threshold $\alpha 2$ ($<\alpha 1$).

If the load increase rate is equal to or higher than the threshold $\alpha 2$ (NO in S340), the processing returns to S330 and the control unit 410 continues to satisfy the additional amount of power by the power supplied from the specified vehicle.

If the load increase rate is lower than the threshold $\alpha 2$ and the load variations become stable (YES in S340), the processing proceeds to S350 and the control unit 410 determines the power allocation so that the power that has been supplied from the specified vehicle is supplied from the vehicle in the generated-power supply mode.

By applying the second exemplary embodiment to the basic configuration in the above-described first exemplary embodiment to perform control according to the processing described above, the power can be allocated more appropriately even when the amount of the load is suddenly increased. The problem with the second exemplary embodiment is that, if a sudden increase in the load does not occur, one vehicle capable of always supplying power in the charged-power supply mode is placed in the standby state and, as a result, the power stored in the standby vehicle is left unused. This means that the amount of power, which might be supplied by the standby vehicle, is generated by the engine, resulting in an increased number of engine operations and a longer engine-operation time. Therefore, whether to use this control should be determined, considering the number of vehicles used as the power supply source and the maximum rated load.

The "generated-power supply mode" and the "charged-power supply mode" in the exemplary embodiments are the "first mode" and the "second mode" in the present invention respectively.

The embodiments disclosed herein are to be considered merely illustrative and not restrictive in any respect. The scope of the present invention is defined not by the foregoing description but by the appended claims, and it is intended that the scope of the present invention include all modifications that fall within the meaning and scope equivalent to those of the appended claims.

The invention claimed is:

1. A power supply system for supplying power to an external electrical apparatus wherein the power supply system comprises a control device that controls power to be supplied to the electrical apparatus; and a plurality of vehicles each having an accumulator device; and an internal combustion engine, wherein:
    when power is supplied to the electrical apparatus, the power supply system allows the plurality of vehicles to be electrically connected in parallel, each of the plurality of vehicles capable of selecting one of a first mode and a second mode, the first mode being a mode in which the internal combustion engine is driven to generate power, the second mode being a mode in which power stored in the accumulator device is supplied with the internal combustion engine stopped,
    when power is supplied from the plurality of connected vehicles to the electrical apparatus, the control device controls at least one of the plurality of vehicles to operate in the second mode,
    the control device switches the vehicles from the second mode to the first mode based on a charge state of each of the accumulator devices mounted on the plurality of vehicles, and
    when a charge state of the accumulator device mounted on a vehicle, which stores more power among the plurality of vehicles, becomes smaller than a predetermined threshold, the control device switches at least one of remaining vehicles to the first mode.

2. The power supply system according to claim 1, wherein the control device switches one of the plurality of vehicles, whose accumulator-device charge state becomes smaller than a reference value indicating a lower limit, to the first mode and, at the same time, switches one of the remaining vehicles, which is operating in the first mode and whose accumulator-device charge state is larger than the threshold, from the first mode to the second mode.

3. The power supply system according to claim 1, wherein the threshold is a value indicating an amount of power that allows the electrical apparatus to continuously operate for a predetermined time in a predetermined load state.

4. The power supply system according to claim 1, wherein the control device causes a vehicle of the plurality of vehicles, which operates in the first mode, to charge the accumulator device using at least a part of the power generated by the vehicle.

5. The power supply system according to claim 1, wherein the vehicle includes a rotary motor having Y-connected three-phase coils and power from the vehicle is supplied to the electrical apparatus via neutral points of the three-phase coils.

6. The power supply system according to claim 1, wherein the control device is mounted on one of the plurality of vehicles.

7. A power supply system for supplying Rower to an external electrical apparatus wherein the power supply system comprises a control device that controls power to be supplied to the electrical apparatus, and a plurality of vehicles each having an accumulator device and an internal combustion engine, wherein:
when power is supplied to the electrical apparatus, the power supply system allows the plurality of vehicles to be electrically connected in parallel, each of the plurality of vehicles capable of selecting one of a first mode and a second mode, the first mode being a mode in which the internal combustion engine is driven to generate power, the second mode being a mode in which power stored in the accumulator device is supplied with the internal combustion engine stopped,
when power is supplied from the plurality of connected vehicles to the electrical apparatus, the control device controls at least one of the plurality of vehicles to operate in the second mode,
the control device switches the vehicles from the second mode to the first mode based on a charge state of each of the accumulator devices mounted on the plurality of vehicles, and
the control device switches at least one of the plurality of vehicles to the first mode when a total of accumulator-device charge states of the plurality of vehicles becomes smaller than a predetermined threshold.

8. The power supply system according to claim 7, wherein the control device switches at least one of the plurality of vehicles to the first made when a total of accumulator-device charge states of the plurality of vehicles becomes smaller than a predetermined threshold.

9. A power supply system for supplying power to an external electrical apparatus wherein the power supply system comprises a control device that controls power to be supplied to the electrical apparatus; and a plurality of vehicles each having an accumulator device; and an internal combustion engine, wherein:
when power is supplied to the electrical apparatus, the power supply system allows the plurality of vehicles to be electrically connected in parallel, each of the plurality of vehicles capable of selecting one of a first mode and a second mode, the first mode being a mode in which the internal combustion engine is driven to generate power, the second mode being a mode in which power stored in the accumulator device is supplied with the internal combustion engine stopped,
when power is supplied from the plurality of connected vehicles to the electrical apparatus, the control device controls at least one of the plurality of vehicles to operate in the second mode, and
if there is a vehicle of the plurality of vehicles that operates in the first mode and a load increase rate of the electrical apparatus is higher than a first predetermined value, the control device controls the vehicle which operates in the second mode to supply power corresponding to an increased load amount of the electrical apparatus.

10. The power supply system according to claim 9, wherein if the load increase rate of the electrical apparatus falls below a second predetermined value that is smaller than the first predetermined value, the control device performs control the vehicle that operates in the first mode to supply power corresponding to an increased load amount of the electrical apparatus.

11. A power supply system for supplying power to an external electrical apparatus wherein the power supply system comprises a control device that controls power to be supplied to the electrical apparatus; and a plurality of vehicles each having an accumulator device; and an internal combustion engine, wherein:
when power is supplied to the electrical apparatus, the power supply system allows the plurality of vehicles to be electrically connected in parallel, each of the plurality of vehicles capable of selecting one of a first mode and a second mode, the first mode being a mode in which the internal combustion engine is driven to generate power, the second mode being a mode in which power stored in the accumulator device is supplied with the internal combustion engine stopped,
when power is supplied from the plurality of connected vehicles to the electrical apparatus, the control device controls at least one of the plurality of vehicles to operate in the second mode, and
when all vehicles have been in the second mode and a charge stat of an accumulator device of one vehicle is below a threshold, the control device controls this vehicle to operate in the first mode, and the control device controls another vehicle to operate in the second mode.

* * * * *